United States Patent [19]
Ravitts

[11] Patent Number: 5,855,472
[45] Date of Patent: Jan. 5, 1999

[54] DIVING BELL SUBMERSIBLE SEAL

[76] Inventor: Richard B. Ravitts, 2410 Devonshire Dr., Rockford, Ill. 61107

[21] Appl. No.: 740,257

[22] Filed: Oct. 25, 1996

[51] Int. Cl.[6] .............................. F16J 15/40; F01D 11/04
[52] U.S. Cl. .................... 417/421; 417/423.11; 277/431; 277/432
[58] Field of Search .............................. 417/421, 423.11; 277/431, 432

[56] References Cited

U.S. PATENT DOCUMENTS

| | | | |
|---|---|---|---|
| 1,949,796 | 3/1934 | Himmel | 103/87 |
| 2,918,016 | 12/1959 | Olson | 103/87 |
| 3,416,729 | 12/1968 | Ravitts et al. | 239/16 |
| 3,606,273 | 9/1971 | Johnson | 259/95 |
| 3,856,272 | 12/1974 | Ravitts | 259/95 |
| 4,089,620 | 5/1978 | Ravitts | 417/61 |
| 4,940,911 | 7/1990 | Wilson | 310/87 |

*Primary Examiner*—Timothy Thorpe
*Assistant Examiner*—Ehud Gartenberg

*Attorney, Agent, or Firm*—Leydig, Voit & Mayer, Ltd.

[57] ABSTRACT

A submersible seal that operates in a substantially frictionless manner is provided for protecting a motor from liquid intrusion along the shaft. Motors of this type are commonly used, for example, in aerators, pumps, mixers, flow developers, and the like. The submersible seal of the present invention includes a stationary seal element and a rotating seal element. The stationary seal element is in the form of a tubular section which is attached to the motor casing, surrounding but spaced from the rotating shaft. The rotating seal element, is a cylindrical section which is attached to the rotatable shaft and inter-engages the stationary seal element to form a labyrinth passageway having a first end at the casing of the motor, a second end opposite the first end, and at least one reverse bend therebetween. Liquid from the body of liquid in which the motor is immersed attempts to enter the first end of the labyrinth passage, and in so doing compresses an air cushion in the labyrinth passage. The geometry is such that the air cushion occupies the reverse bend, and serves as a liquid seal to prevent ingress of liquid.

21 Claims, 4 Drawing Sheets

DIVING BELL SUBMERSIBLE SEAL

TECHNICAL FIELD OF THE INVENTION

The present invention relates generally to seals and, more particularly, to a submersible seal for use with aerators, sprayers, pumps, mixers, flow developers, and the like.

BACKGROUND OF THE INVENTION

Devices for aerating, spraying, pumping, mixing, and developing the flow of liquids are well known in the art. Such devices are frequently used, for example, to treat or condition liquids contained in a reservoir such as a pond, a lake, a lagoon, a canal, a tank, a waste treatment basin, or the like. Aerators, in particular, are commonly used to enrich the oxygen content of water by pumping it upwardly into the air. Aerators are also used to scrub undesirable gases from liquids and to cool large quantities of liquids for future recirculation. Mixers and flow developers, in contrast, do not pump or spray liquids into the air. Instead, they circulate a body of liquid beneath its top surface. In this way, mixers and flow developers are commonly used, for example, to blend different types of liquids together and to agitate biological or other solids that are suspended in a liquid.

Many devices of this type are designed to float on the top surface of a liquid. Such floating devices include an impeller attached to a rotatable shaft, a motor for rotating the shaft, and a buoyant float for supporting the motor relative to the top surface of the liquid. When the impeller is rotated by the motor, liquid is either pumped into the air (in the case of aerators), or circulated below its surface (in the case of mixers and flow developers). In either event, the motor is either arranged on the float (as a non-submersible or partially-submersible motor), or beneath the float (as a fully-submersible motor). Floating aerators, mixers, and flow developers are disclosed, for example, in U.S. Pat. Nos. 3,416,729 (Ravitts et al.), 3,606,273 (Johnson), 3,856,272 (Ravitts), and 4,089,620 (Ravitts).

Other devices of this type are statically arranged on the bottom surface (or floor) of the liquid filled reservoir. Such stationary devices include an impeller attached to a rotatable shaft, a motor for rotating the shaft, and a stand for supporting the motor relative to the bottom surface of the liquid body. Of course, the motor of such stationary devices is fully-submersible.

In both floating and stationary devices, certain precautions must be taken in order to prevent liquids from invading, entering, and damaging the motor. In most instances, a submersible seal fabricated from a hard and insoluble material (e.g., silicon carbide or tungsten carbide) is disposed between the motor and the shaft in order to seal and protect the motor from leakage. Although effective for relatively short durations, such seals suffer from many noted deficiencies including, but not limited to: (1) a susceptibility to friction and corrosion; (2) a tendency to wear and leak; (3) a propensity to freeze-up in icy conditions; (4) a need for frequent servicing and/or replacement; and (5) a high relative cost.

OBJECTS AND SUMMARY OF THE INVENTION

Accordingly, a primary object of the present invention is to provide a submersible seal for use with aerators, pumps, mixers, flow developers, and the like that overcomes the above-identified deficiencies of the prior art.

Another object of the present invention is to provide a submersible seal that continuously protects non-submersible, partially-submersible, and fully-submersible motors from liquid intrusion and damage.

A further object of the present invention is to provide a submersible seal that operates in a substantially frictionless or wear-free manner.

A related object of the present invention is to provide a submersible seal that operates in a substantially leak-free manner.

A related object of the present invention is to provide a submersible seal that requires infrequent servicing and/or replacement.

An additional object of the present invention is to provide a submersible seal that is relatively inexpensive to manufacture, operate, and maintain.

Still another object of the present invention is to provide a submersible seal that is reliable, durable, and convenient to use.

In accordance with these and other objects, a substantially frictionless submersible seal is provided for protecting a motor from liquid intrusion and damage. Motors of this type are commonly used, for example, in aerators, pumps, mixers, flow developers, and the like. The submersible seal of the present invention includes a stationary seal element and a rotating seal element. The stationary seal element, in particular, is attached to the casing of the motor. It includes at least one tubular section surrounding but spaced from the motor shaft, and extending along a substantial length thereof proximate the casing. The rotating seal element, is attached to the rotatable shaft at its distal end, and inter-engages the stationary seal element to form a labyrinth passageway having a first end at the casing of the motor, a second end opposite the first end, and at least one reverse bend therebetween. In use, the labyrinth passageway includes an air-filled segment which extends through the reverse bend and blocks liquid to prevent water from infiltrating the casing of the motor. The submersible seal of the present invention operates in a substantially frictionless or wear-free manner.

These and other objects, features, and advantages of the present invention will become apparent upon reading the following detailed description of the preferred embodiments, and upon reference to the accompanying drawings.

BRIEF DESCRIPTION OF THE DRAWINGS

In the drawings, wherein similar reference numerals denote similar elements throughout the several views.

Figure 1:
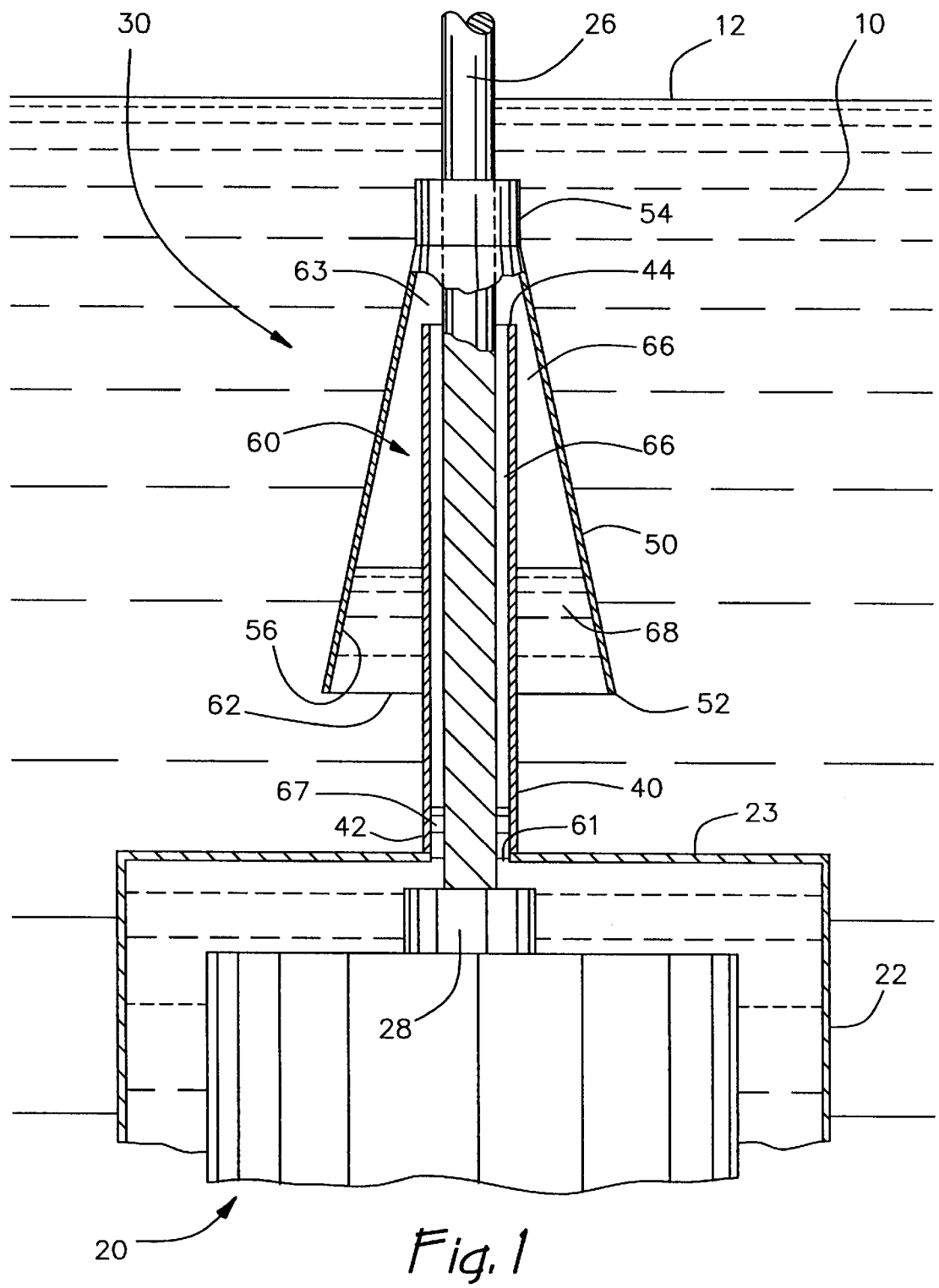
FIG. 1 is a partially fragmentary cross-sectional view of a first embodiment of a submersible seal constructed in accordance with the teachings of the present invention.

While the present invention will be described and disclosed in connection with certain preferred embodiments, the intent is not to limit the present invention to these specific embodiments. On the contrary, the intent is to cover all such alternatives, modifications, and equivalents that fall within the spirit and scope of the present invention as defined by the appended claims.

DETAILED DESCRIPTION OF THE PREFERRED EMBODIMENTS

The present invention may best be understood with reference to the accompanying drawings, wherein two embodiments of a submersible seal constructed in accordance with the teachings of the present invention are shown in FIGS. 1–2 and 3–4, respectively. In both embodiments, the submersible seal is adapted to be at least partially submerged in a body of liquid 10 (e.g., a pond, a lake, a lagoon, a canal, a tank, a waste treatment basin, or the like) having a top surface (or level) 12. The submersible seal, however, may alternatively be positioned above the top surface 12 for providing splash protection to the associated motor.

As shown in the drawings, the submersible seal is used in conjunction with a motor 20 having a protective casing 22, a rotatable shaft 26 which protrudes from the casing 22, and one or more bearings 28 which rotatably support the shaft 26. Because the motor 20 may operate in a corrosive environment, the shaft 26 of the motor 20 is preferably fabricated from a sturdy, resilient, and anti-corrosion resistant material such as 17-4PH stainless steel (i.e., precipitation hardened 17-4 stainless steel).

In order to reduce the operating temperature of the motor 20 and also improve bearing 28 lubrication, the casing 22 of the motor 20 is preferably filled or substantially-filled with dielectric oil. Alternatively, the motor 20 may be air-cooled within the casing 22. Of course, air-cooled motors have considerably less thermal conductivity and cooling effectiveness than liquid-cooled motors. Although the motor is shown as having a standard motor enclosure and a separate sealed casing 22, it will be appreciated that the casing 22 can represent the motor housing itself, and that separate jackets are not required.

Depending on its intended use, the motor 20 may either be fully-submersed, partially-submersed, or non-submersed in the body of liquid 10. For example, the motor 20 may be coupled to a buoyant float (not shown), or statically arranged on the bottom surface (or floor) of the body of liquid 10. In either event, an impeller (not shown) is attached to the shaft 26 in order to pump liquid upwardly into the air (in the case of aerators), or to circulate liquid beneath the top surface 12 of the liquid 10 (in the case of mixers and flow developers).

Figure 2:
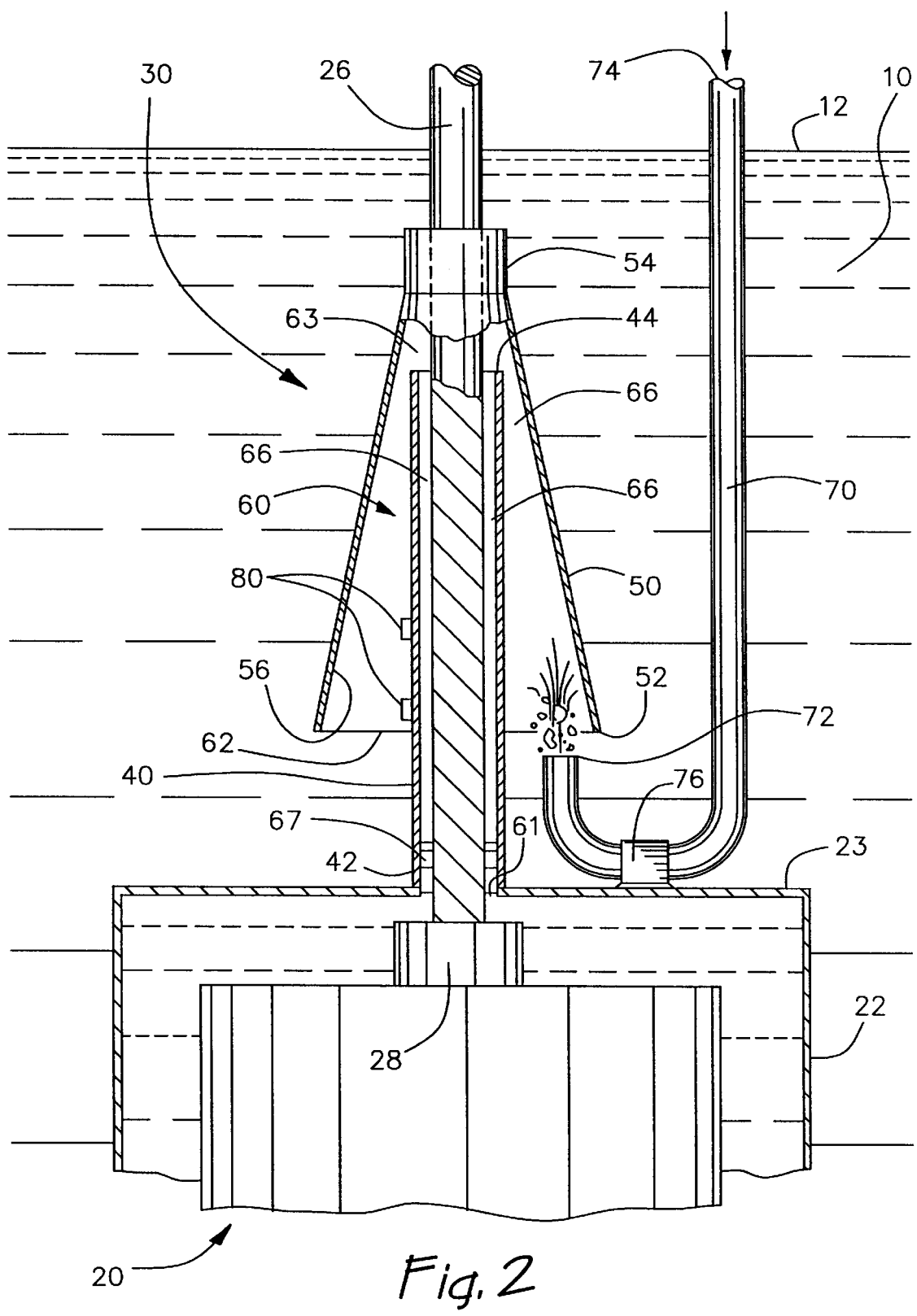
FIG. 2 is a partially fragmentary cross-sectional view of a modified embodiment of the submersible seal depicted in FIG. 1.

As shown in FIGS. 1 and 2, the first embodiment of the submersible seal is designated generally by reference numeral 30. This first embodiment of the submersible seal 30 is ideally suited for a fully-submersed motor 20 having an upwardly extending rotatable shaft 26 (i.e., a shaft 26 that extends upwardly from the casing 22).

In accordance with an important aspect of the present invention, the submersible seal 30 includes a stationary seal element 40 and a rotating seal element 50 which cooperate to form a trapped air cushion which protects the motor 20 from liquid intrusion and damage. The stationary seal element 40, in particular, is attached to the upper surface 23 of the casing 20 and is arranged around, partially along, and spaced-apart from the rotatable shaft 26. The rotating seal element 50, in contrast, is attached to the rotatable shaft 26 and inter-engages the stationary seal element 40 to form a labyrinth passageway 60 therebetween. A collar 54 is coupled to the shaft 26 in a leak proof manner so that air trapped between the rotating and stationary tube remains trapped and does not leak out past the collar 54. As shown in FIG. 1, the labyrinth passageway 60 includes a first end 61 disposed at the casing 22 of the motor 20, a second end 62 opposite the first end 61, and a reverse bend 63 therebetween. The labyrinth passageway 60 also includes an intermediate air-filled segment 66 which extends through the reverse bend 63 to provide an air barrier which prevents liquid from infiltrating the casing 22 of the motor 20. As shown in FIG. 1, the air-filled segment 66 is located between the shaft 26 and the stationary seal element 40 and also between the stationary seal element 40 and the rotating seal element 50.

Thus, the motor with casing is typically oil filled, and after the sealing elements are put in place, the motor is lowered into the water, the air which occupies the labyrinth passageway between the stationary and rotatable elements 40, 50 is partly compressed by water entering the labyrinth passageway 60 at the end 62. A bubble or cushion of compressed air is thus trapped in the labyrinth passageway between the water segment 68 which begins to ingress at the open end 62 and the oil 67 at the motor end 61 of the tube. This compressed air bubble, which occupies the reverse bend area 63 serves as an effective seal separating the water of the environment from the fluid which occupies the motor casing. As a result, the motor will be sealed from its liquid environment.

In accordance with another important aspect of the present invention, the submersible seal 30 of the present invention operates in a substantially frictionless or wear-free manner because the labyrinth passageway 60 defines a relatively large space between the stationary seal element 40 and the rotating seal element 50. Thus, even when the submersible seal 30 is unbalanced or subject to eccentric rotation, there will be no frictional contact between the stationary seal element 40 and the rotating seal element 50.

As shown in FIGS. 1 and 2, the first embodiment of the stationary seal element 40 is in the shape of an annular cylindrical tube having a bottom portion 42 and an open top portion 44. More specifically, the bottom portion 42 of the stationary seal element 40 is attached to the upper surface 23 of the casing 22 and is open with respect thereto, while the open top portion 44 is spaced-apart from the upper surface 23 of the casing 22. The first embodiment of the rotating seal element 50, in contrast, is generally cone-shaped in configuration and includes an open bottom portion (or skirt) 52, a closed top portion (or collar) 54, and an inner conical surface 56. As shown in FIGS. 1 and 2, the collar 54 of the rotating seal element 50 is attached to the shaft 26, and is positioned above and spaced-apart from the open top portion 44 of the stationary seal member 40. The skirt 52 of the rotating seal element 50, on the other hand, is located between the upper surface 23 of the casing 22 and the open top portion 44 of the stationary seal member 40 (i.e., above the upper surface 23 of the casing 22).

The rotating seal element 50 is preferably fabricated from thermoplastic material, or from material having similar characteristics. Ultra-high molecular weight polyethylene (i.e., UHMW polyethylene) is ideally suited for this purpose. In addition to being strong, resilient, and anti-corrosive, UHMW polyethylene also permits the rotating seal element 50 to be advantageously shrunk-fit onto the rotatable shaft 26 of the motor 20. For example, the rotating seal element 50 may be expanded slightly by immersing it in a warm fluid (e.g., water up to 212° F.) and, once it has expanded sufficiently, it may then be conveniently slipped onto the shaft 26. After the rotating seal element 50 returns to ambient temperature, it will be securely attached to (i.e., shrunk-fit onto) the rotatable shaft 26.

The stationary seal element 40 may also be made of thermoplastic material. However, it is preferred to use stainless steel to facilitate attachment to the motor casing (as by welding) and to avoid the use of special brackets or attachment clips.

In accordance with yet another important aspect of the present invention, the centrifugal force generated by the rotatable shaft 26 and the attached rotating seal element 50, together with the conical shape of the rotating seal element 50, pushes liquid out of, rather than up, the labyrinth passageway 60. Also, the air-filled segment 66 of the labyrinth passageway 60 provides a buffer of trapped air which prevents liquid from infiltrating the casing 22 of the motor 20. In this way, the submersible seal 30 of the present invention protects the motor 20 from liquid intrusion and damage.

In the illustrated embodiment, the inner surface 56 of the conically-shaped rotating seal element 50 is disposed at approximately a 15° angle with respect to the stationary seal element 40 and the rotating shaft 26 of the motor 20. It will be readily appreciated by those skilled in the art, however, that the inner surface 56 of the rotating seal element 50 may alternatively have a larger or smaller inclination angle.

In addition to having an air-filled segment 66, the labyrinth passageway 60 may further include an oil-filled segment 67. Because the bearing 28 of the motor 20 is spaced-apart from the upper surface 23 of the casing 22 in the illustrated embodiment, the air-filled segment 66 of the labyrinth passageway 60 is in direct fluidic communication with the substantially oil-filled casing 22 of the motor 20. Of course, if too much oil is supplied to the casing 22, oil will flow upwardly into the labyrinth passageway 60. Should this occur, the labyrinth passageway 60 would also include an oil-filled segment 67 disposed between the rotatable shaft 26 and the stationary seal element 40, as shown, for example, in FIG. 1. Such an oil-filled segment 67 would, of course, be situated immediately below and in direct fluidic communication with the air-filled segment 66.

Preferably, the air-filled segment 66 of the labyrinth passageway 60 extends most or all of the way down to the open bottom portion (or skirt) 52 of the rotating seal element 50. Usually there will be a water filled segment 68 at the bottom end 62 which is in contact with and compresses the trapped air in the buffer segment 66. In the illustrated embodiment, the liquid-filled segment 68 of the labyrinth passageway 60 is disposed immediately below the air-filled segment 66 and also between the rotating seal element 50 and the stationary seal element 40. As shown in FIG. 1, the liquid-filled segment 68 is in direct fluidic communication with both the body of liquid 10 and the air-filled segment 66 of the labyrinth passageway 60.

Because the air-filled segment 66 of the labyrinth passageway 60 is trapped between the stationary seal element 40 and the rotating seal element 50, the submersible seal 30 of the present invention operates in a virtually leak-free manner. Thus, the air bubble is trapped in the section 60 between liquid from the body of water at the entrance 62 and the oil or other fluid associated with the motor at the entrance 61. By virtue of the trapped air bubble extending through the reverse bend area 63, it will not be possible for liquid from the body of water to penetrate the air bubble to reach the inside of the motor, nor will it be possible for oil or whatever fluid is in the motor to penetrate the air bubble to reach the water in the body in which the motor is immersed. Thus, the apparatus presents an effective seal by use of the trapped air bubble separating the fluid in the two separate environments. Even in the case where the motor is not oil filled, the fluid associated with the motor will, for example, be air, and the air bubble trapped between the body of water and the environment of the motor, and occupying the reverse bend portion 63 of the passage will prevent water from the body of water from penetrating the barrier to enter the motor. In fact, the shaft 26 of the motor 20 must be tipped almost horizontally before air will leak from the air-filled segment 66 of the labyrinth passageway 60.

During installation, the motor 20 and the submersible seal 30 of the present invention are slowly lowered into the body of liquid 10 in order to trap air within the air-filled segment 66 of the labyrinth passageway 60. As this occurs, the air-filled segment 66 is subjected to increasing pressure levels which cause it to shrink in size. When it is desired to compensate for this volumetric reduction, a feed tube 70 is provided for supplying supplemental air to the air-filled segment 66 of the labyrinth passageway 60. The feed tube 70 also helps offset any leakage that may occur in the submersible seal 30 once the motor 20 is situated at a desired depth. As shown in FIG. 2, the feed tube 70 includes an outlet 72 which is located underneath and spaced-apart from the open bottom portion (or skirt) 52 of the rotating seal element 50. The feed tube 70 also includes an inlet 74 which is connected to a compressed air supply (e.g., air compressor) (not shown). In the illustrated embodiment, the feed tube 70 is attached to the casing 22 of the motor 20 via a bracket 76 which, in turn, is welded to the upper surface 23 of the casing 22. In operation, supplemental air is conveniently supplied to the air-filled segment 66 of the labyrinth passageway 60 by forcing compressed air through the feed tube 70 and bubbling it up into the open bottom portion 52 of the rotating seal element 50, as shown in FIG. 2.

Depending upon the desired mode of operation, supplemental air may either be supplied to the air-filled segment 66 of the labyrinth passageway 60 on a continuous basis (by constantly operating the air compressor), or on a non-continuous basis (by intermittently operating the air compressor). If supplemental air is continuously supplied, any excess air that is not captured by the air-filled segment 66 will simply bubble up to the top surface 12 of the body of liquid 10 and dissipate into the atmosphere. If, however, supplemental air is non-continuously supplied, one or more moisture sensors 80 should be attached to the outer surface of the stationary seal element 40, as shown, for example, in FIG. 2. In use, the moisture sensors 80 detect the presence or absence of liquid within the labyrinth passageway 60 which, in turn, determines whether supplemental air needs to be delivered thereto. Of course, in order to be effective, the moisture sensors 80 should be intelligently linked to the air compressor.

As an added feature of the present invention, the moisture sensors 80 and the air compressor also provide a means of damage detection. For example, if supplemental air is being delivered from the air compressor to the air-filled segment 66 of the labyrinth passageway 60 on a more frequent basis than normal, one skilled in the art may readily ascertain that the submersible seal 30 is damaged, leaking, or in need of immediate servicing.

Figure 3:
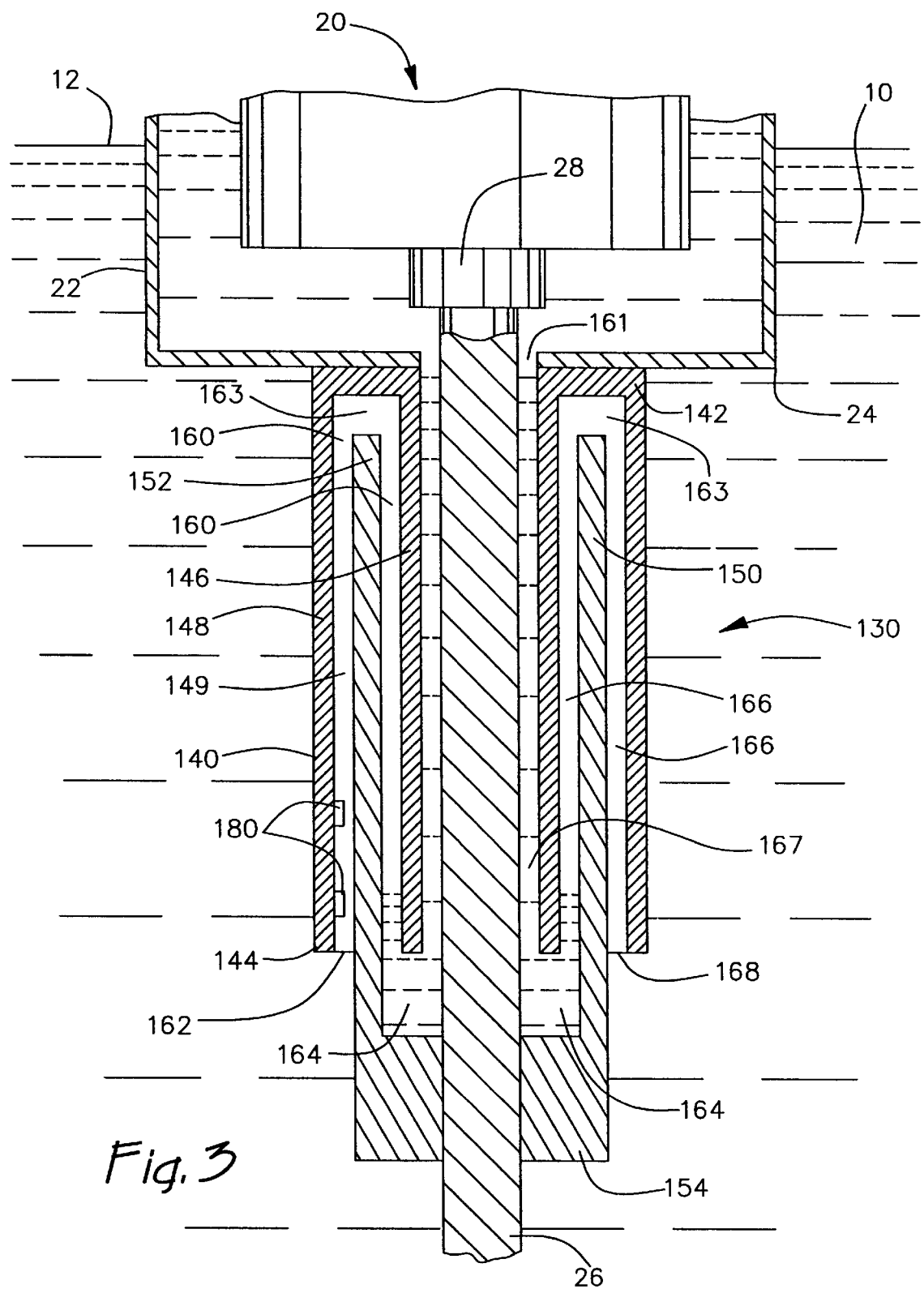
FIG. 3 is a partially fragmentary cross-sectional view of a second embodiment of the submersible seal.
Figure 4:
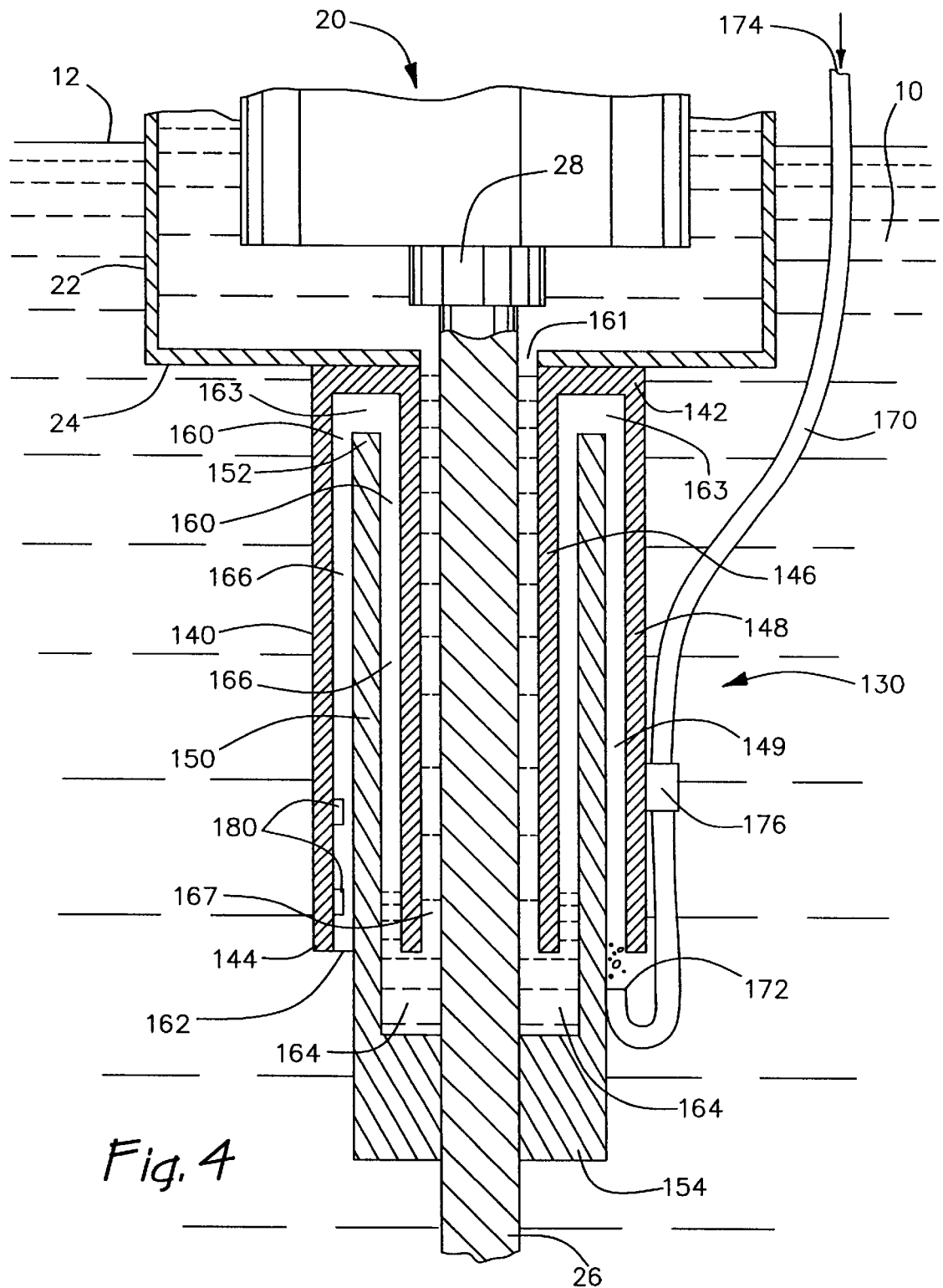
FIG. 4 is a partially fragmentary cross-sectional view of a modified embodiment of the submersible seal depicted in FIG. 3.

As shown in FIGS. 3 and 4, the second embodiment of the submersible seal is designated generally by reference numeral 130. Although the motor 20 of the second embodiment is depicted as partially-submerged in the body of liquid 10, it will be appreciated by those skilled in the art that the motor 20 may, alternatively, be fully-submerged or non-submerged. In any event, the motor 20 of the second embodiment includes a downwardly protruding rotatable shaft 26 (i.e., a shaft 26 that extends downwardly from the casing 22).

Like the first embodiment, the second embodiment of the submersible seal 130 includes a stationary seal element 140 and a rotating seal element 150 which cooperate to form an air cushion which prevents liquid from entering the casing 22 of the motor 20. As shown in FIGS. 3 and 4, the stationary seal element 140 is attached to the lower surface 24 of the casing 20 and is arranged around, partially along, and spaced-apart from the rotatable shaft 26. The rotating seal element 150, in contrast, is attached to the rotatable shaft 26 and is inter-engaged with the stationary seal element 140 to form a labyrinth passageway 160 therebetween. As shown in FIG. 3, the labyrinth passageway 160 includes a first end 161 disposed at the lower surface 24 of the casing 20, a second end 162 opposite the first end 161, and a pair of reverse bends 163 and 164 therebetween. The labyrinth passageway 160 also includes an air-filled segment 166 which occupies the upper reverse bend 163 and serves as a liquid barrier to prevent liquid from infiltrating the casing 22 of the motor 20.

In accordance with another important aspect of the present invention, the submersible seal 130 of the present invention operates in a substantially frictionless or wear-free manner because the labyrinth passageway 160 defines a relatively large space between the stationary seal element 140 and the rotating seal element 150. Thus, even when the submersible seal 130 is unbalanced or subject to eccentric rotation, there will be no frictional contact between the stationary seal element 140 and the rotating seal element 150.

The second embodiment of the stationary seal element 140 includes a closed top portion 142 and an open bottom end 144. As shown in FIGS. 3 and 4, the closed top portion 142 of the stationary seal element 140 is attached to the lower surface 24 of the casing 22, while the open bottom end 144 is spaced-apart therefrom. The second embodiment of the stationary seal element 140 also includes inner and outer concentrically arranged cylindrical tube sections 146 and 148 which are separated by a generally annular-shaped cylindrical chamber 149. Preferably, the stationary seal element 140 is fabricated from a sturdy, resilient, and corrosion resistant material such as 304 or 316 stainless steel.

The rotating seal element 150 of the second embodiment is in the shape of an annular cylindrical tube having an open top portion 152 and a bottom collar portion 154. More specifically, the collar portion 154 is attached to the shaft 26, while the open top portion 152 fits within the generally annular-shaped cylindrical chamber 149 of the stationary seal element 140 to form the labyrinth passageway 160, as well as the upper and lower reverse bends 163 and 164. Like the first embodiment, the rotating seal element 150 of the second embodiment is preferably fabricated from UHMW polyethylene and shrunk-fit onto the shaft 26.

In addition to having an air-filled segment 166, the labyrinth passageway 160 also includes an oil-filled segment 167, as shown in FIG. 3. Because the bearing 28 of the motor 20 is spaced-apart from the lower surface 24 of the casing 22 in the illustrated embodiment, gravity causes the lower bend 164 of the labyrinth passageway 160 to be filled with oil from the casing 22 of the motor 20. Of course, the oil-filled segment 167 of the labyrinth passageway 160 is in direct fluidic communication with the air cushion in the air-filled segment 166. The air cushion in segment 166, at the other end 162 of the labyrinth passageway is in contact with the water from the body of water 130. It will be apparent that in the illustrated embodiment a small portion of the segment identified by reference numeral 168 is filled with water. Thus, as in the prior embodiments, liquid from the body of water in which the apparatus is immersed and fluid from the motor on respective ends of the labyrinth passageway compress a cushion of air between them in the labyrinth passageway. That cushion of air occupies at least one reverse bend, and thus is configured to block the passage of liquid from either end through the cushion to the other. As such, an effective liquid seal is provided.

Because the air-filled segment 166 of the labyrinth passageway 160 is effectively trapped between the stationary seal element 140 and the rotating seal element 150, the second embodiment of the submersible seal 130 operates in a virtually leak-free manner. In fact, like the first embodiment, the shaft 26 of the motor 20 must be tipped almost horizontally before air will leak from the air-filled segment 166 of the labyrinth passageway 160.

As in the first embodiment, a feed tube 170 may also be provided for supplying supplemental air to the air-filled segment 166 of the labyrinth passageway 160. As shown in FIG. 4, the feed tube 170 includes an outlet 172 which is located underneath and spaced-apart from the open bottom portion 144 of the stationary seal element 140. The feed tube 170 also includes an inlet 174 which is connected to an air compressor (not shown). In the illustrated embodiment, the feed tube 170 is attached to the stationary seal element 140 via a bracket 176 which, in turn, is attached to the outer cylindrical tube section 148 of the stationary seal element 140. In use, supplemental air is conveniently supplied to the air-filled segment 164 of the labyrinth passageway 160 by forcing compressed air through the feed tube 170 and bubbling it up into the open bottom portion 144 of the stationary seal element 140. During installation (i.e., as the motor 20 and the submersible seal 130 are being lowered into the body of liquid 10), the feed tube 170 delivers supplemental air to the labyrinth passageway 160 which compensates for the resulting volumetric reduction of the air-filled segment 166. Also, once the motor 20 and the submersible seal 130 are properly situated at a desired depth, the supplemental air supplied by the feed tube 170 helps offset any leakage that may occur in the submersible seal 130.

In practice, supplemental air may either be supplied to the labyrinth passageway 160 on a continuous basis (by constantly operating the air compressor), or on a non-continuous basis (by intermittently operating the air compressor). If supplied on a continuous basis, any supplemental air that is not captured by the air-filled segment 166 of the labyrinth passageway 160 will simply bubble up to the top surface 12 of the body of liquid 10 and dissipate into the atmosphere. If, however, supplemental air is supplied on a non-continuous basis, one or more moisture sensors 180 should be attached to the inner surface of the outer cylindrical tube section 148 of the stationary seal element 140, as shown, for example, in FIG. 4. Of course, like the first embodiment, the moisture sensors 180 should also be intelligently linked to the air compressor. In this way, supplemental air may be automatically delivered from the air compressor to the air-filled segment 166 of the labyrinth passageway 160 on an as-needed basis (i.e., when the moisture sensors 180 indicate that the labyrinth passageway 160 is wet). Also, by observing the frequency at which supplemental air is supplied from the air compressor to the labyrinth passageway 160, it may be advantageously determined whether the submersible seal 130 is damaged, leaking, or in need of servicing.

What is claimed is:

1. A submersible seal for protecting a motor from liquid intrusion and damage, the motor including a sealed fluid tight protective casing having a single shaft opening through which extends a rotatable motor shaft, the submersible seal comprising, in combination:

a stationary seal element connected to the casing of the motor the stationary seal element including at least one cylindrical tube surrounding but spaced from the motor shaft and extending along a substantial length of said shaft proximate the casing; and a rotating seal element attached to the shaft at its distal end and inter-engaged with the stationary seal element to form a labyrinth passageway, the labyrinth passageway having a first end at the casing of the motor, a second end opposite the first end, and at least one reverse bend therebetween.

2. The submersible seal as defined in claim 1, wherein there is no frictional contact between the stationary seal element and the rotating seal element.

3. The submersible seal as defined in claim 1, wherein the motor is at least partially submerged in a body of liquid which enters the second end of the labyrinth seal.

4. The submersible seal as defined in claim 3, wherein the labyrinth passageway includes an air-filled segment which occupies said reverse bend and prevents liquid from infiltrating the casing of the motor.

5. The submersible seal as defined in claim 4, wherein the casing of the motor and a segment of the labyrinth passageway at the first end thereof are filled with oil.

6. The submersible seal as defined in claim 5, wherein air in the air-filled segment of the labyrinth passageway is compressed between the oil at the first end and at the liquid at the second end to block flow of the liquid past the air filled segment.

7. The submersible seal as defined in claim 4, further comprising:

a feed tube for supplying the air-filled segment of the labyrinth passageway with supplemental air.

8. The submersible seal as defined in claim 7, wherein at least one moisture sensor is attached to the stationary seal element for detecting the presence of liquid within the labyrinth passageway.

9. The submersible seal as defined in claim 1, wherein the rotating seal element is fabricated from thermoplastic material.

10. The submersible seal as defined in claim 1, wherein the rotating seal element is fabricated from ultra-high molecular weight polyethylene.

11. The submersible seal as defined in claim 1, wherein the stationary seal element is fabricated from stainless steel.

12. A submersible seal disposed at least partially in a body of liquid for protecting a motor from liquid intrusion and damage, the motor including a sealed fluid tight casing having a single shaft opening and a rotatable shaft which extends therethrough, the submersible seal comprising, in combination:

a stationary seal element mounted to the casing of the motor, the stationary seal element comprising a tubular section surrounding but spaced from the motor shaft and extending along a substantial length thereof proximate the casing, and a rotating seal element attached to the shaft at the distal end inter-engaged with the stationary seal element to form a labyrinth passageway, the labyrinth passageway having a first end at the casing of the motor, a second end opposite the first end, and at least one reverse bend therebetween, the labyrinth passageway including an air-filled segment which extends through the reverse bend and blocks the passage of liquid from infiltrating the casing of the motor.

13. The submersible seal as defined in claim 12, wherein the stationary seal element is in the shape of an annular cylindrical tube.

14. The submersible seal as defined in claim 12, wherein the rotating seal element is substantially cone-shaped.

15. The submersible seal as defined in claim 12, further comprising:

a feed tube attached to the casing of the motor for supplying the air-filled segment of the labyrinth passageway with supplemental air.

16. The submersible seal as defined in claim 12, wherein the stationary seal element comprises two concentric cylindrical tubes fixed to the casing, and the rotating seal comprises a rotating cylindrical tube fixed to the motor shaft and extending between the concentric tubes.

17. A submersible seal disposed at least partially in a body of liquid for protecting a motor from liquid intrusion and damage, the motor including a sealed fluid-tight casing having a shaft opening and a rotatable shaft which extends therethrough, the submersible seal comprising, in combination:

a stationary seal element connected to the casing of the motor at the shaft opening and having a cylindrical tubular section surrounding a length of the shaft proximate the casing; and a rotating seal element attached to and surrounding a portion of the shaft at the distal end thereof, the rotating seal element being inter-engaged with the stationary seal element to form a labyrinth passageway having a first end at the casing of the motor, a second end opposite the first end open to the body of liquid, and at least one reverse bend therebetween, the labyrinth passageway comprising a sealed passageway for trapping an air cushion compressed by liquid from the body of liquid entering the first end, the air cushion extending through at least one reverse bend to prevent flow of liquid past the air cushion thereby to protect the motor from ingress of liquid.

18. The submersible seal as defined in claim 17, wherein the stationary seal element includes inner and outer concentrically arranged cylindrical tube sections which are separated by a generally annular-shaped cylindrical chamber.

19. The submersible seal as defined in claim 18, wherein the rotating seal element is in the shape of an annular cylindrical tube having a closed top portion that attaches to the rotatable shaft and an open bottom portion that fits within the generally annular-shaped cylindrical void of the stationary seal element to form the labyrinth passageway and two reverse bends.

20. The submersible seal as defined in claim 17, further comprising:

a feed tube for supplying the air-filled segment of the fluid passageway with supplemental air.

21. The submersible seal as defined in claim 17 wherein the stationary seal element includes a cylindrical tube secured to the casing, and the rotating seal element surrounds the cylindrical tube to form said labyrinth passage.

* * * * *